United States Patent Office 3,740,389
Patented June 19, 1973

3,740,389
FAST HYDRATING ALKALI METAL CARBOXY-ALKYL POLYGALACTOMANNANS AND PROCESS FOR PREPARING SAME
Robert Nordgren, Minneapolis, Minn., assignor to General Mills Chemicals, Inc.
No Drawing. Filed May 26, 1970, Ser. No. 40,745
Int. Cl. C07c 47/18
U.S. Cl. 260—209 R
10 Claims

ABSTRACT OF THE DISCLOSURE

The hydration rate of polygalactomannans such as guar gum is substantially improved by forming the alkali metal carboxyalkyl derivatives thereof using defined reactant ratios and an alcohol-water solvent system.

---

The present invention relates to the preparation of improved derivatives of polygalactomannans. More particularly, it relates to a process of preparing alkali metal carboxyalkyl polygalactomannans using certain solvents and defined reactant ratios. It also relates to the resulting fast hydrating products.

In certain applications, polygalactomannan gums, and more particularly guar gum, do not hydrate as fast as is desired. When such gums are derivatized in a certain manner, improvements in hydration rates can be obtained. Thus for example, when guar gum is reacted with propylene oxide, the hydration rate of the resulting hydroxypropyl guar derivative is appreciably greater than that of the unmodified guar. Reactions of guar with acrylamide and ethylene oxide improve hydration rates only by small amounts.

I have now discovered that the hydration rate of polygalactomannan gums can be increased to a surprising and unexpected extent by reacting the same with a halo fatty acid or alkali metal salt thereof at defined reaction ratios and using certain solvents. The improved products of the invention find particular use in oil well fracturing fluids and other applications where thickening and fast hydration rates are desired. Examples of the latter applications are thickening certain ammonium and sodium nitrate explosive slurries where the gum must be 90% hydrated in 5 minutes and thickening solutions of ammonium phosphate used in fighting forest fires.

The term "polygalactomannans" as used herein includes the general class of polysaccharides containing both galactose and mannose units. The polygalactomannans are usually found in the endosperm sections of leguminous seeds such as guar, locust bean, honey locust, flametree and *Cassia occidentalis*. The invention has particular value in providing improved derivatives of guar gum due to the ready availability of the same.

In accordance with the present invention, the galactomannan is reacted with a halo fatty acid or alkali metal salt thereof. Suitable halo fatty acids include chloroacetic acid, chloropropionic acid, chlorobutyric acid and the like. The said halo fatty acids can have 2 to 4 carbon atoms in the fatty chain. It is preferred to use the sodium salts of the halo fatty acids and sodium chloroacetate is the particularly preferred reactant.

The described halo fatty acid reactant is used in an amount of from about 0.05 to 0.20 equivalents per mole of the polygalactomannan. Amounts in the lower end of this range improve hydration rates moderately while amounts of the halo fatty acid reactant above 0.20 equivalents yield products with a much lower viscosity. The preferred range is 0.10 to 0.15 equivalents per mole of the polygalactomannan.

The solvent is a combination of water and a monohydride alcohol of 2 to 4 carbon atoms. The preferred such alcohol is isopropanol. Other of these alcohols, such as ethanol, n-propanol and tertiary butanol, are also useful but are more costly than isopropanol. The water-alcohol ratio is not critical. Some water must be present to slightly swell the polygalactomannan gum but too much water will swell the gum so much that filtration will be difficult. The preferred alcohol-water weight ratio is between about 1.5:1 to 4:1. The solvent will be used in an amount sufficient to allow the reactants to be easily stirred with moderate amounts of mechanical energy. Preferably the solvent will be used in an amount of between about 100 to 400 parts per 100 parts by weight of the gum.

An alkali metal hydroxide is also added to the reaction mixture in excess of the halo fatty acid reactant. The amount thereof should be kept below the point where significant alkali degradation occurs. Thus it is preferred that the same be used in an amount of about 0.05 to 0.10 equivalents more than the halo fatty acid reactant or in an amount of about 0.10 to 0.30 equivalents per mole of the polygalactomannan gum.

Since alkali degradation causes a reduction in the products viscosity producing character, it is optionally but preferably desirable to add a small amount of sodium borohydride to the reaction mixture. It is known that sodium borohydride will reduce carbonyl groups on polysaccharides. And it is believed that these carbonyl groups are the sites for any alkali degradation of the polygalactomannan gum. The sodium borohydride is thus optionally added in an amount of about 0.01 to 0.10 gram per 100 grams of the gum.

It is also desirable to complete the reaction as quickly as possible in order to reduce any alkali degradation of the gum. Thus the reaction is preferably conducted at reflux temperatures and, at such temperatures, will normally be complete in from about 1 to 5 hours. However, the reaction is preferably conducted at temperatures of 60 to 81° C. The reaction time is not critical but is desirably as short as possible at the reaction temperature used.

At the completion of the reaction, it is preferred to neutralize the reaction mixture by the addition of an acid such as acetic, hydrochloric, sulfuric, nitric, and the like. This also aids in preventing alkali degradation of the product.

The product may be filtered or centrifuged and dried. It is also preferred to grind the product to a reasonably small particle size, i.e. such that 90% or more thereof will pass through a 200 mesh screen.

The following examples illustrate certain preferred embodiments of the invention without being limiting. The examples also include comparative products not falling within the scope of the invention.

EXAMPLE I

Into a one liter round bottom reaction flask fitted with a thermometer, stirrer and condenser were added the following: 100 g. (0.5 mole) guar flour (90% passing a standard 200 mesh screen), 175 g. technical isopropanol, 11.7 g. (0.20 equiv.) sodium chloroacetate and 60 g. water containing 5 g. (0.25 equiv.) sodium hydroxide. The reaction mixture was stirred and heated to 70° C. and then heating was continued for an additional three hours during which period reflux temperatures of 80–81° C. was reached. At the completion of the reaction period, the reaction mixture was neutralized with acetic acid (1.1 times the weight of the sodium hydroxide). The warm neutral reaction mixture was filtered on a Buchner filter, washed with a small amount of isopropanol and dried at room temperature. The dried product was ground fine so that at least 90% of it would pass through a 200 mesh screen.

The hydration rate of the product was measured by the following procedure. 2.4 g. dried product was added at once to 500 g. distilled water (80° F.) that was stirred rapidly in a Waring Blender (the Variac was set between 30 and 35 volts and the blender turned on the high speed setting). After 10 seconds in the blender, the sol was poured into a 600 ml. beaker and the viscosity measured with a Model 35 Fann Viscometer at 100 r.p.m. Measurements were made at 1, 2 and 5 minutes after which the solution was placed in an 80° F. water bath for 55 minutes and the viscosity again measured. The Fann viscosities at 1, 2, 5 and 60 minutes were 42.0, 43.8, 45.0 and 46.2, respectively. Since the reading at 60 minutes represents substantially complete viscosity development, the data show that over 90% of the final viscosity is attained in one minute.

A 1.0% aqueous solution of the dried product was also prepared and placed in a 25° C. water bath. After standing overnight, the viscosity was measured with a Brookfield viscometer at 20 r.p.m. and the reading was 1400 centipoises.

EXAMPLES II–XIII AND COMPARATIVE EXAMPLES XIV AND XV

Example I was essentially repeated using reaction times and varying equivalents of sodium chloroacetate and sodium hydroxide per 100 grams guar flour as set forth in the following table. Sodium borohydride was also added at a level of 0.04% by weight based on the weight of the guar flour in some of the examples.

TABLE

| | Reaction time (hrs.) | Equiv. of NaClAc | Equiv. of NaOH | Sodium borohydride (percent) | 1% visc. (Brookfield) | Fann viscosity after— | | | |
|---|---|---|---|---|---|---|---|---|---|
| | | | | | | 1 min. | 2 min. | 5 min. | 60 min |
| Example: | | | | | | | | | |
| II | 2.5 | 0.20 | 0.25 | 0 | 1,600 | 46.8 | 46.8 | 46.8 | 46.2 |
| III | 2.5 | 0.20 | 0.25 | 0.04 | 1,700 | 49.8 | 50.4 | 51.0 | 48.0 |
| IV | 2.0 | 0.20 | 0.25 | 0 | 2,100 | 54.6 | 55.2 | 55.2 | 54.0 |
| V | 2.0 | 0.15 | 0.20 | 0 | 2,450 | 52.2 | 53.4 | 53.4 | 54.0 |
| VI | 1.8 | 0.15 | 0.17 | 0 | 2,400 | 45.0 | 57.0 | 48.0 | 51.6 |
| VII | 1.8 | 0.10 | 0.12 | 0 | 2,800 | 28.0 | 28.0 | 33.0 | 42.0 |
| VIII | 1.8 | 0.05 | 0.20 | 0 | 2,400 | 33.0 | 39.6 | 44.4 | 48.0 |
| IX | 1.9 | 0.15 | 0.20 | 0.04 | 2,650 | 43.8 | 47.4 | 51.6 | 52.2 |
| X | 1.9 | 0.10 | 0.20 | 0.04 | 2,600 | 49.2 | 50.4 | 50.4 | 51.0 |
| XI | 1.0 | 0.10 | 0.20 | 0.04 | 2,400 | 46.2 | 49.0 | 50.4 | 50.4 |
| XII | 1.5 | 0.10 | 0.20 | 0.04 | 2,450 | 46.8 | 52.2 | 54.0 | 54.0 |
| XIII | 1.8 | 0.10 | 0.20 | 0.04 | ᵃ 1,500 | 46.2 | 51.0 | 54.0 | 54.0 |
| Comparative: | | | | | | | | | |
| XIV | 1.8 | 0.0 | 0.20 | 0 | 2,400 | 9.6 | 14.4 | 27.0 | 47.4 |
| XV ᵇ | | | | | 5,150 | 6.0 | 13.2 | 27.6 | 55.8 |

ᵃ Product made in pilot plant—900 times the size of other examples. Because of the size of the run, the product may have had local overheating which may account for the lower viscosity.
ᵇ Unmodified guar flour.

The above data show the fast hydration rates of the products of the invention over unmodified guar flour and the same modified only with sodium hydroxide. The products of the invention are eminently suited as thickeners (0.4 to 1.0% by weight) for oil well fracturing fluids.

The embodiments of the invention in which an exclusive property or privilege is claimed are defined as follows:

1. A process for preparing an alkali metal carboxyalkyl polygalactomannan having a fast hydration rate which comprises reacting a polygalactomannan with from about 0.05 to 0.20 equivalents per mole of the polygalactomannan of a chloro fatty acid of 2 to 4 carbon atoms or an alkali metal salt thereof, said reaction being carried out in the presence of an alkali metal hydroxide in an amount in excess of the equivalents of the chloro fatty acid reactant and in a monohydric alcohol-water solvent system wherein the alcohol contains 2 to 4 carbon atoms and the solvent system is used in an amount sufficient to allow the reactants to be easily stirred.

2. The process of claim 1 wherein the polygalactomannan is guar gum.

3. The process of claim 2 wherein the chloro fatty acid reactant is sodium chloroacetate.

4. The process of claim 3 wherein the alkali metal hydroxide is sodium hydroxide.

5. The process of claim 4 wherein the alcohol is isopropanol.

6. The process of claim 5 wherein the reaction is carried out for about one to five hours at reflux temperatures, the sodium chloroacetate is used in an amount of 0.10 to 0.15 equivalents per mole of the guar gum, the sodium hydroxide is present in an amount of about 0.10 to 0.30 equivalents per mole of the guar gum, the alcohol-water weight ratio in the solvent system is between about 1.5 and 4, and the solvent system is used in an amount of between about 100 to 400 parts per 100 parts of the guar gum.

7. The process of claim 6 wherein a small amount of sodium borohydride is added to the reaction mixture.

8. The process of claim 6 wherein the reaction mixture is neutralized by the addition of an acid, dried and ground to a fine particle size.

9. The product prepared by the process of claim 1.
10. The product prepared by the process of claim 8.

References Cited
UNITED STATES PATENTS

| 2,477,544 | 7/1949 | Moe | 260—209 R |
| 2,520,161 | 8/1950 | Moe | 260—209 R |
| 2,599,771 | 6/1952 | Moe | 260—209 R |
| 2,602,789 | 7/1952 | Schwartz et al. | 260—234 R |
| 3,467,647 | 9/1969 | Benninga | 260—209 R |

LEWIS GOTTS, Primary Examiner
J. R. BROWN, Assistant Examiner

U.S. Cl. X.R.
252—8.55 R